United States Patent [19]

Nilsson

[11] 3,708,762

[45] Jan. 2, 1973

[54] ELECTRONIC OSCILLATOR USING R-C FILTER IN WHICH FREQUENCY IS CONTROLLED BY ONE RESISTOR

[75] Inventor: Lars Konrad Nilsson, Hagersten, Sweden

[73] Assignee: Telefonaktiebolaget LM Ericsson, Stockholm, Sweden

[22] Filed: April 29, 1971

[21] Appl. No.: 138,455

[30] Foreign Application Priority Data

June 2, 1970 Sweden ................................7627/70

[52] U.S. Cl. ............331/108 B, 331/135, 331/177 R, 333/70 CR

[51] Int. Cl. ...............................................H03b 5/24

[58] Field of Search ..............331/135–137, 140–142, 331/177 R, 108 B, 110; 333/70 CR

[56] References Cited

UNITED STATES PATENTS

| | | | |
|---|---|---|---|
| 2,583,649 | 1/1952 | Hewlett | 331/141 |
| 3,555,448 | 1/1971 | Clarke, Jr. et al. | 331/177 X |

*Primary Examiner*—Roy Lake
*Assistant Examiner*—Siegfried H. Grim
*Attorney*—Hane, Baxley & Spiecens

[57] ABSTRACT

An electric oscillator includes a source of electrical energy coupled to a frequency determining network. The network includes first and second branches connected in parallel wherein the first branch comprises a capacitor and the second branch comprises a variable resistor connected to one end of each of two fixed resistors whose other ends are interconnected by a further capacitor.

3 Claims, 5 Drawing Figures

INVENTOR
LARS KONRAD NILSSON
BY Hane, Baxley and Spiecens
ATTORNEYS

INVENTOR
LARS KONRAD NILSSON
BY Hane, Baxley and Spiecens
ATTORNEYS

INVENTOR
LARS KONRAD NILSSON
BY Hane, Baxley and Spiecens
ATTORNEYS

ELECTRONIC OSCILLATOR USING R-C FILTER IN WHICH FREQUENCY IS CONTROLLED BY ONE RESISTOR

The present invention relates to a frequency variable oscillator comprising an energy emitting part and a frequency determining part.

Frequency variable oscillators of several different types are known before. In one of these types the frequency determining part comprises four branches of which two are resistive and two are reactive. Of the reactive branches one consists of a capacitor and a resistor in a series connection and the other of a capacitor and a resistor connected in parallel with each other. These four branches are joined together to form a bridge circuit. The frequency of such a circuit can be varied either by varying the values of the two capacitors in a certain relation to each other or by varying the values of the resistors included in the reactive branches in a certain relation to each other.

It is many times desirable to be able to vary the frequency of the oscillator by means of a control voltage. This is possible if for example both the capacitors are capacitance diodes, the forward voltage of which then can be varied with a control voltage. However the frequency controlling range will be small when capacitance diodes are used. Another and often better way is, instead, to use as resistors in the reactive branches, for example, field effect transistors. The resistance through these can then be influenced by control voltages on the control electrodes of the transistors.

The present invention relates to a simplified frequency variable oscillator which according to the invention is so built up that only one resistor need be varied in order to achieve the desired frequency variation. According to an improvement of the invention the frequency variation can be achieved by a variable resistance element influenced by a control voltage.

The characteristics of the invention appear from the characterizing parts of the claims enclosed.

The invention will be described more in detail with reference to the accompanying drawing where FIG. 1 schematically shows an example of an oscillator according to the invention.

Figure 1:
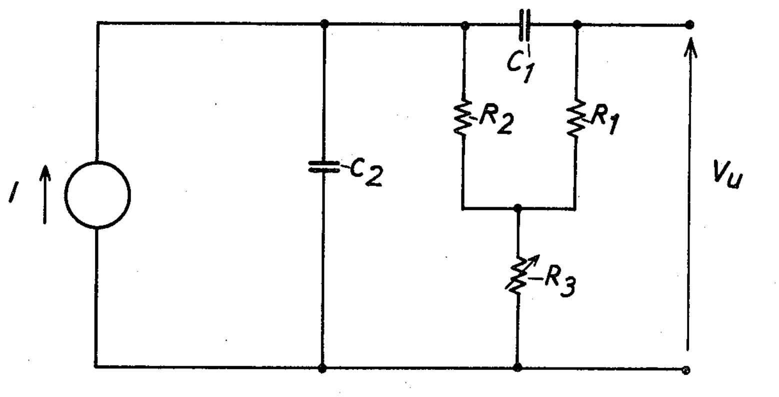

In FIG. 1 a current generator is denoted by I where the current is fed in the direction of the arrow. The current generator is the energy emitting part of the oscillator.

The frequency determining part consists of two parallel branches where one branch contains a capacitor or condenser $C_2$. The other branch contains a variable resistor or resistance $R_3$ which is connected in series with two parallel branches of which one contains a resistance $R_2$ and the other a resistance $R_1$ in series with a condenser $C_1$.

An output voltage $V_u$ is developed across the resistances $R_1$ and $R_3$ and the frequency of this voltage is varied by means of the variable resistance $R_3$.

Figure 2:
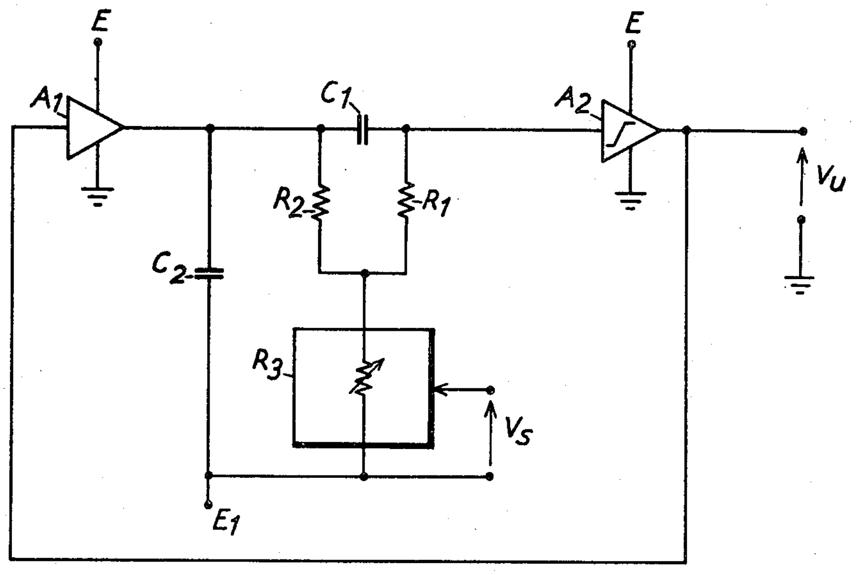
FIG. 2 shows as an example a block diagram of an oscillator according to the invention and FIG. 3 shows a circuit diagram of an oscillator according to FIG. 2.

In FIG. 2, which with a block diagram shows a practical example of an embodiment of an oscillator according to the invention, $A_1$ indicates a voltage controlled current generator connected to an operating supply voltage E and to a fixed reference potential which in this case is ground. The current generator $A_1$ feeds the frequency determining part of the oscillator. This part consists of two parallel branches originating from the current generator which branches in their further common point are connected to a fixed reference potential $E_1$. Of these two parallel branches one consists of a condenser $C_2$ and the other, starting from the current generator, of two parallel branches containing on the one hand a resistance $R_2$ and on the other hand a condenser $C_1$ and a resistance $R_1$ in series whereby these two branches are series connected with a variable resistance $R_3$.

The connection point between the resistance $R_1$ and the condenser $C_1$ is connected to an amplitude limiting amplifier $A_2$ which amplifier is connected to supply voltage E and a reference potential which in this case is ground. The output of the amplifier $A_2$is feedback to the current generator $A_1$ which hereby is voltage controlled. A voltage $V_u$ is developed between the output of the amplifier $A_2$and ground. The frequency of this voltage is varied by the variable resistance $R_3$ which in the block diagram is indicated to be voltage controlled by means of a control voltage $V_s$ which control voltage is referred to the reference voltage $E_1$.

Figure 3:
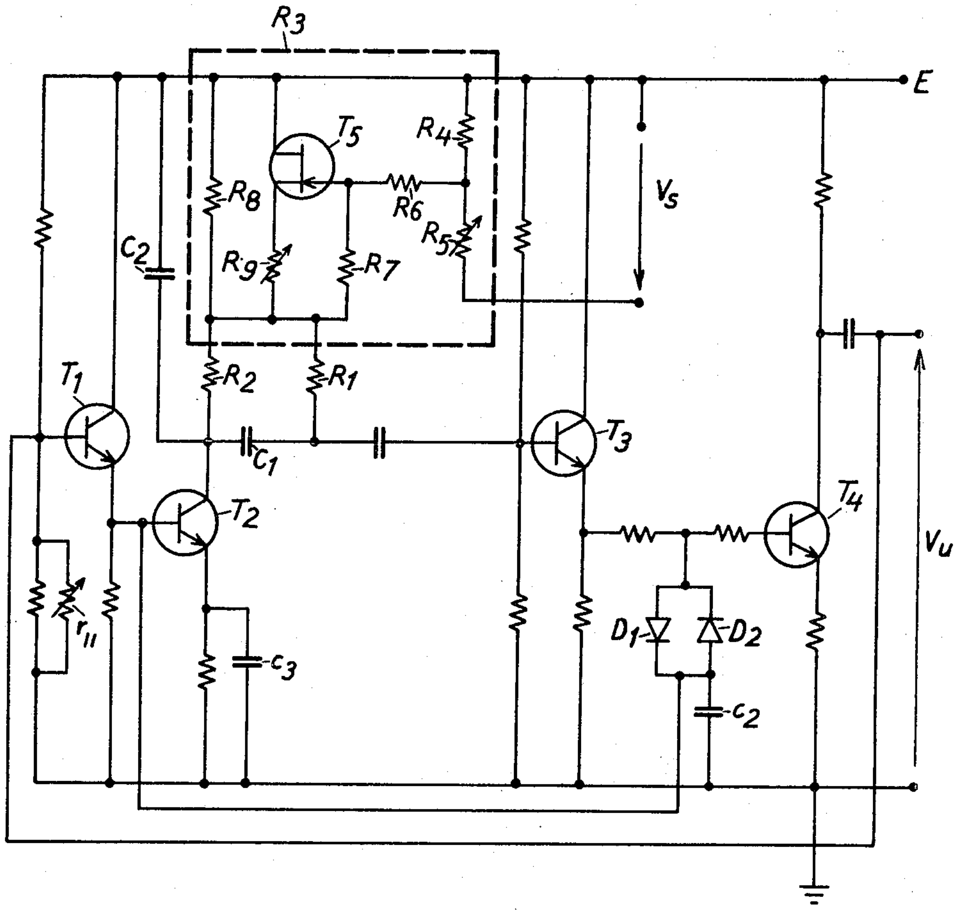

FIG. 3 shows a circuit diagram of an oscillator according to FIG. 2.

The variable resistance $R_3$ in FIG. 2 primarily consists of a field effect transistor $T_5$. This field effect transistor operates as a voltage controlled resistance. The control takes place with the voltage $V_s$ which is referred to the fixed potential E which corresponds to the reference potential $E_1$ in FIG. 2. Of the resistances around the field effect transistor $T_5$, resistors $R_4$, $R_6$, $R_7$ and $R_8$ increase the linear relation between the frequency $f_o$ of the oscillator and the control voltage $V_s$ of the field effect transistor $T_5$. The parameter differences of different examples of field effect transistors can be compensated with the resistances $R_5$ and $R_9$. The voltage controlled current generator in FIG. 2 consists in FIG. 3 mainly of the transistors $T_1$ and $T_2$. The transistors $T_3$ and $T_4$ are amplifiers and the phase opposed diodes $D_1$ and $D_2$ are amplitude limiters. The diodes do not start to conduct until the forward voltage through either of them exceeds a certain threshold value characteristic for the diode in question. When that happens a large negative feedback is developed between the collector and base of the transistor $T_4$ whereby the amplitude of the oscillator is limited. This non-linear operation actuates the phase shift and as the amplitude limiter is direct-current connected, the amplitude limiter must be balanced, the balance being done with the variable resistance $r_{11}$.

The condenser $c_3$ at the emitter of the transistor $T_2$ compensates for phase shift of coupling condensers and transistors. The condenser $c_2$ between the diodes $D_1$ and $D_2$ and ground by-passes to ground possible high-frequency self-oscillations, if any.

If the field effect transistor $T_5$ is cut down more and more owing to the fact that the voltage $V_s$ is reduced the resistance through the main electrodes of the field effect transistor is increased whereby the frequency of the oscillator is reduced.

By the positive regeneration from the collector of the transistor $T_4$, that is the output of the oscillator, to the base of the transistor $T_1$ the attenuation of the frequency determining part comprising elements $R_1$, $R_2$, $R_3$, $C_1$ and $C_2$ is compensated so that self-oscillation is caused.

Moreover it can be mentioned that owing to the symmetry of the used field effect transistor, it does not matter if this is reversed with regard to the main electrodes.

The adjusting of the variable resistances $R_5$, $R_9$ and $r_{11}$ is so arranged that the direct current through the diodes $D_1$ and $D_2$ are adjusted to zero with the resistance $r_{11}$. The voltage $V_s$ of the control electrode of the field effect transistor is set to zero and the resistance $R_9$ is then so adjusted that the oscillator emits the maximum frequency desired. With the resistance $R_5$ the linear relation between the frequency $f_0$ of the oscillator and the control voltage $V_s$ can then be adjusted.

Figure 4:
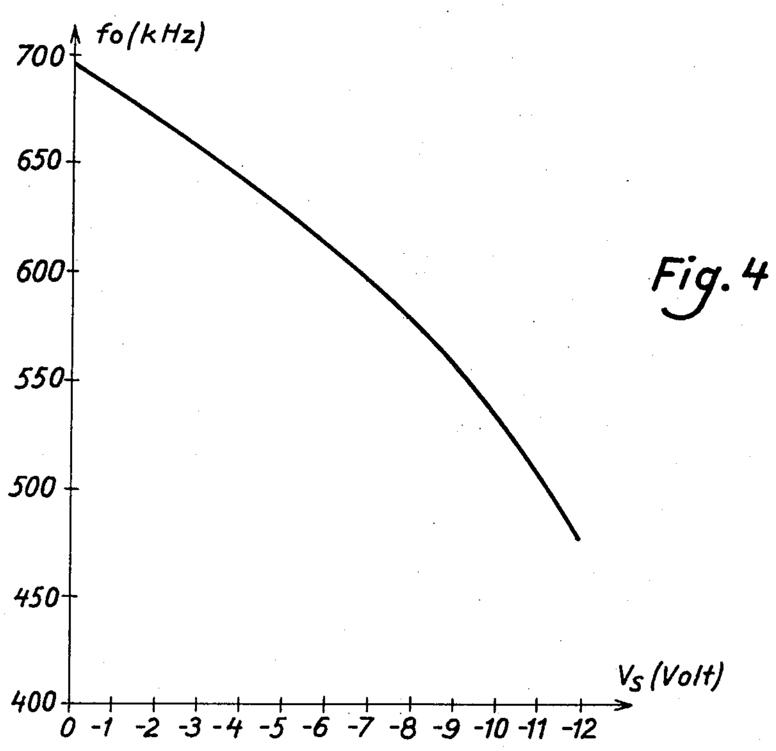
FIGS. 4 and 5 show in diagram form two examples of the relation between the frequency and the control voltage of the oscillator.
Figure 5:
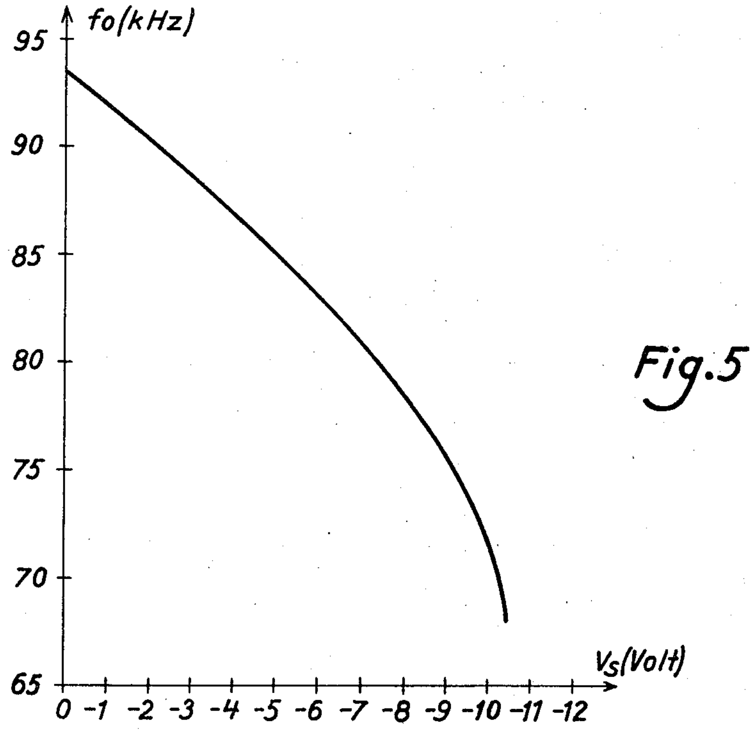

FIGS. 4 and 5 show plots of the frequency $f_0$ of the oscillator in kHz as function of the control voltage $V_s$ in volts of the field effect transistor. It is to be noted that this control voltage $V_s$ is referred to the potential E in FIG. 3 which in this case is 12 volts. The same potential E functions in this case also as a supply voltage for the active units included in the oscillator.

The graph in FIG. 4 was obtained with the coupling shown in FIG. 3. The frequency $f_0$ of the oscillator is about between 500 kHz and 700 kHz when the variation range of the control voltage $V_s$ is 12 volts.

The graph in FIG. 5 is obtained when the condensers $C_1$ and $C_2$ are about ten times bigger than in the preceding example. The frequency $f_0$ of the oscillator then varies between about 70 kHz and 95 kHz when the variation range of the control voltage $V_s$ is 10 volts.

The frequency ranges of the oscillator are mostly changed with the condensers $C_1$ and $C_2$ of the frequency determining part of the oscillator. By means of the control voltage $V_s$ the frequency $f_0$ of the oscillator can then be changed within the frequency range which by an oscillator according to the invention is proportionately large.

In the graphs in FIGS. 4 and 5 the relation between the frequency of the oscillator and the control voltage is mainly linearly. It is only for the lower frequencies within each frequency range that the curve bends somewhat.

In the frequency determining part of the oscillator the resistance $R_1$ and the resistance $R_2$ in the examples have had the same values and the same fact is true for the condensers $C_1$ and $C_2$. However, in principle, possible to let these components have mutually different values although it is often practical to do as in the examples above.

We claim:

1. A variable frequency oscillator comprising a source of electrical energy, a two-terminal frequency determining circuit, means for connecting the source of electrical energy to at least one terminal of said frequency determining circuit, means for applying a reference potential to the other terminal of said frequency determining circuit, said circuit comprising two branches connected across the two terminals, one of said branches including a first capacitor, the other of said branches including a controllably variable resistance element having one end connected to one of said terminals, first and second resistors each having one end connected to the other end of said controllably variable resistance element, a second capacitor connecting the ends of said resistors, and means for connecting said other end of at least one of said resistors to the other of said terminals.

2. The variable frequency oscillator of claim 1 wherein said controllably variable resistance element includes a field effect transistor.

3. The variable frequency oscillator of claim 2 wherein the field effect transistor has two main electrodes connected respectively to the two ends of said controllably variable resistance element and has a control electrode for receiving a control signal for varying the resistance between said two main electrodes.

* * * * *